Figure 2B:
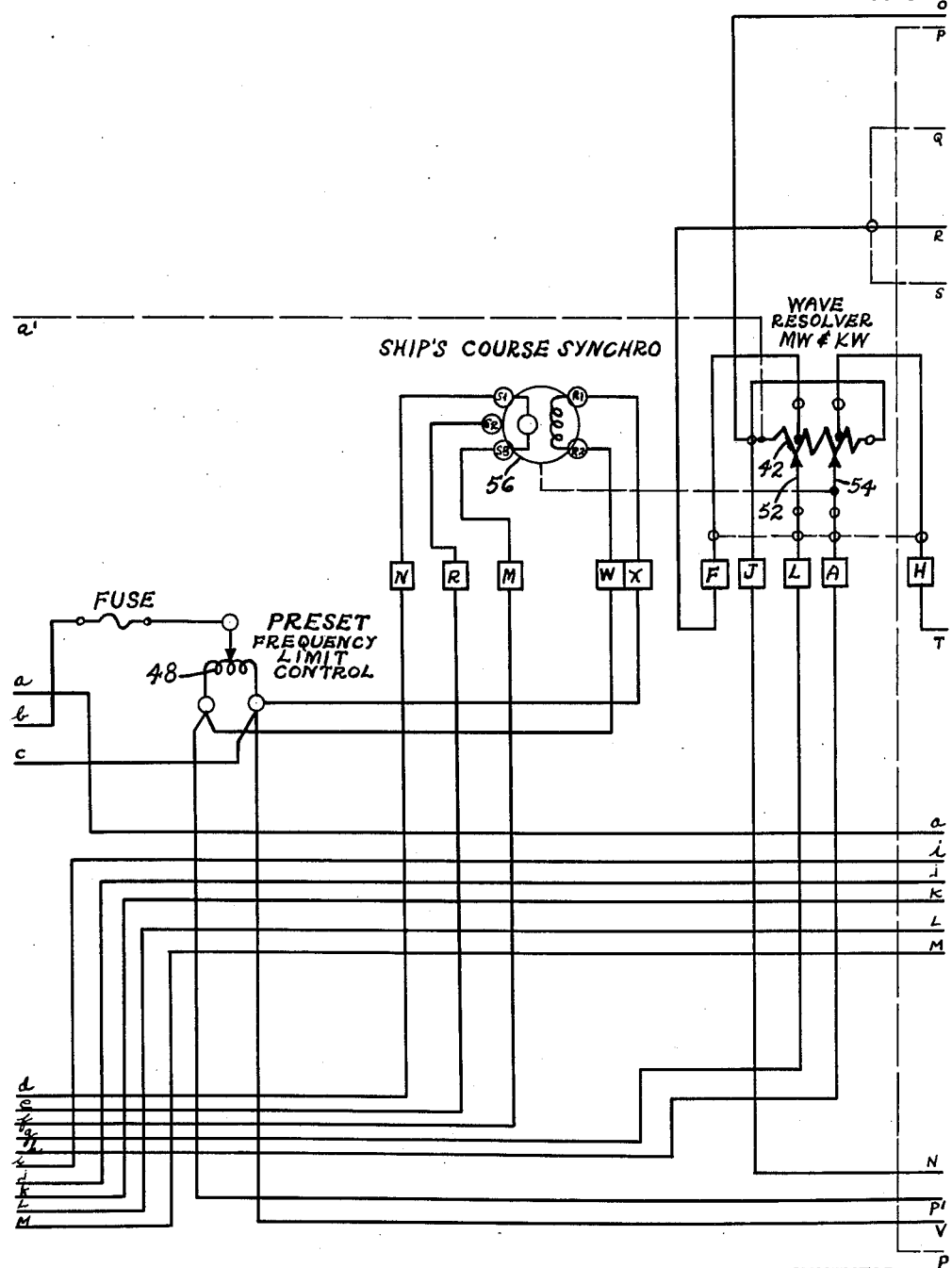

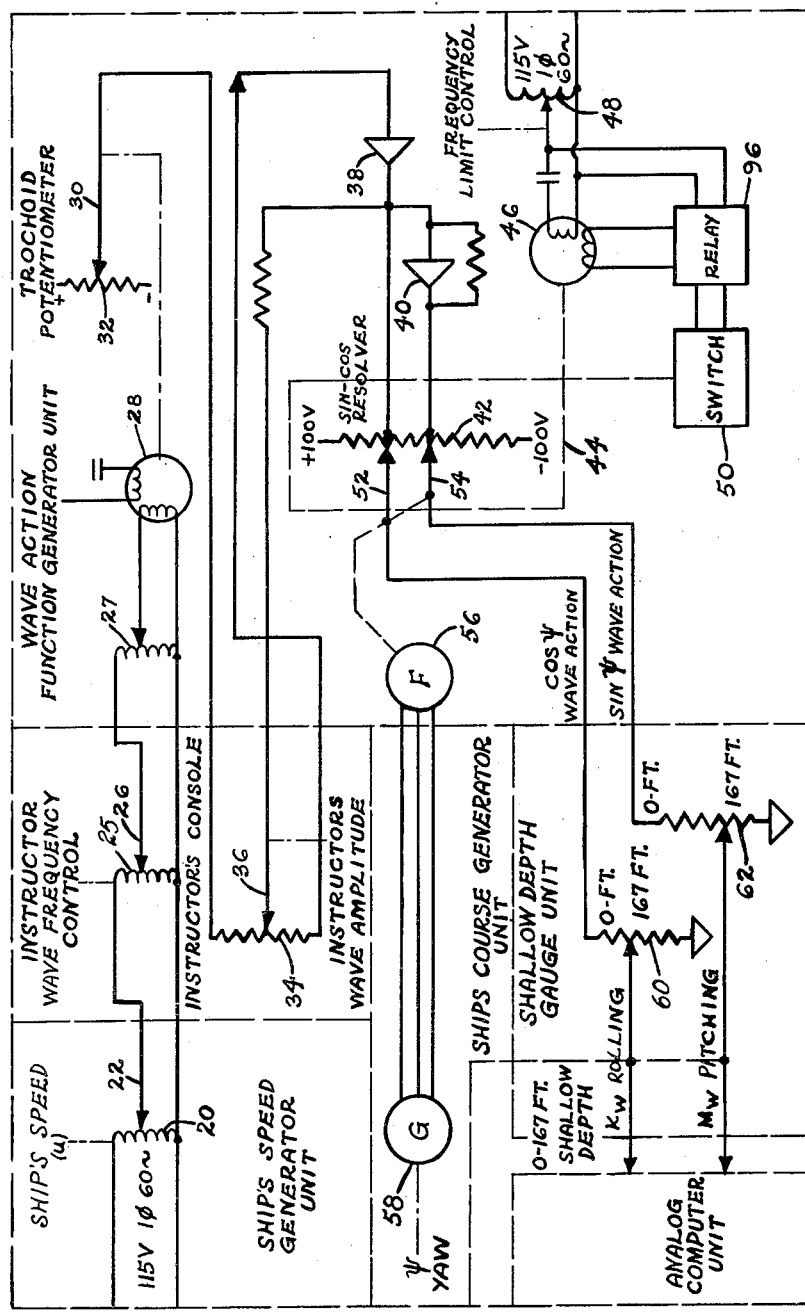

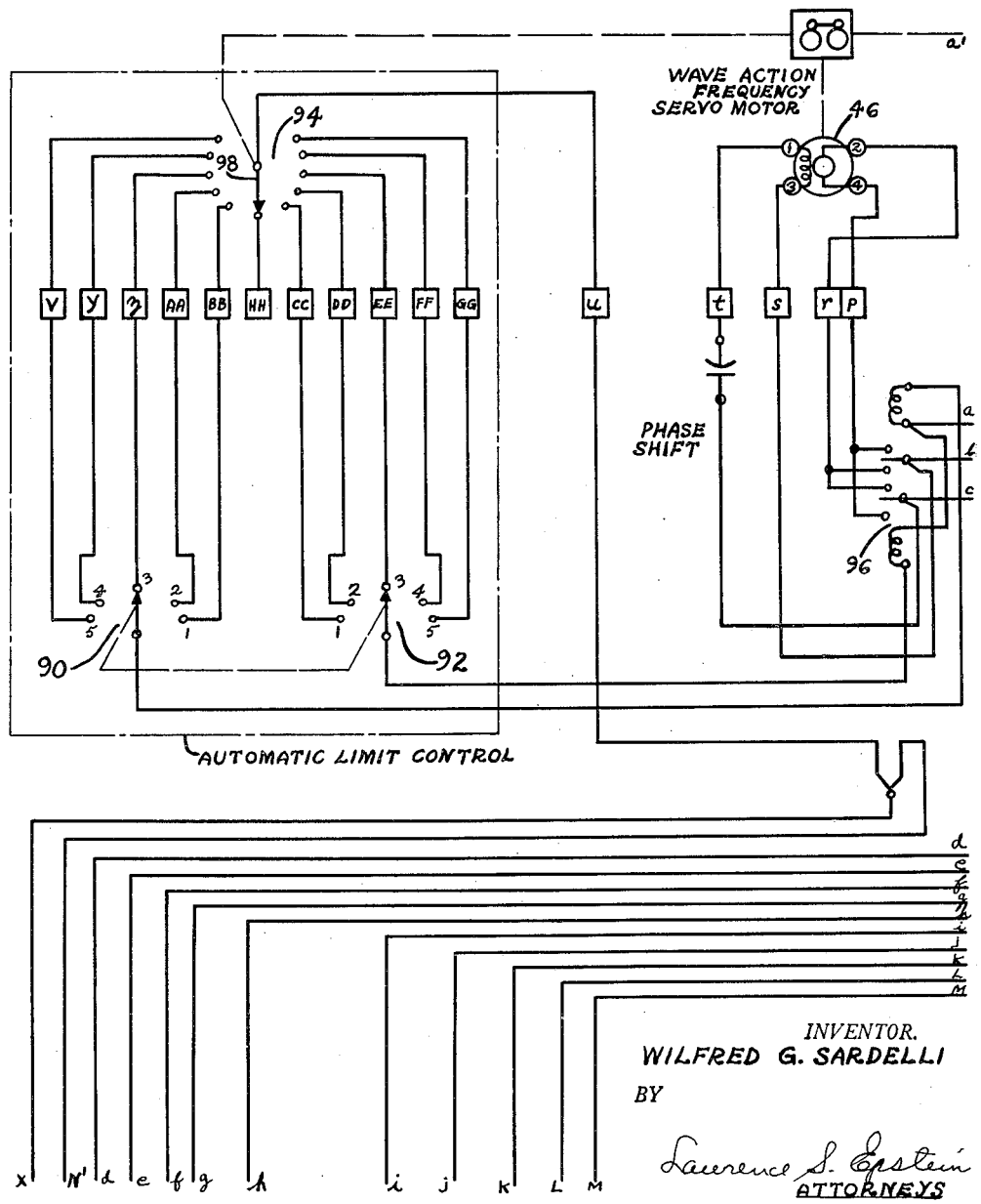

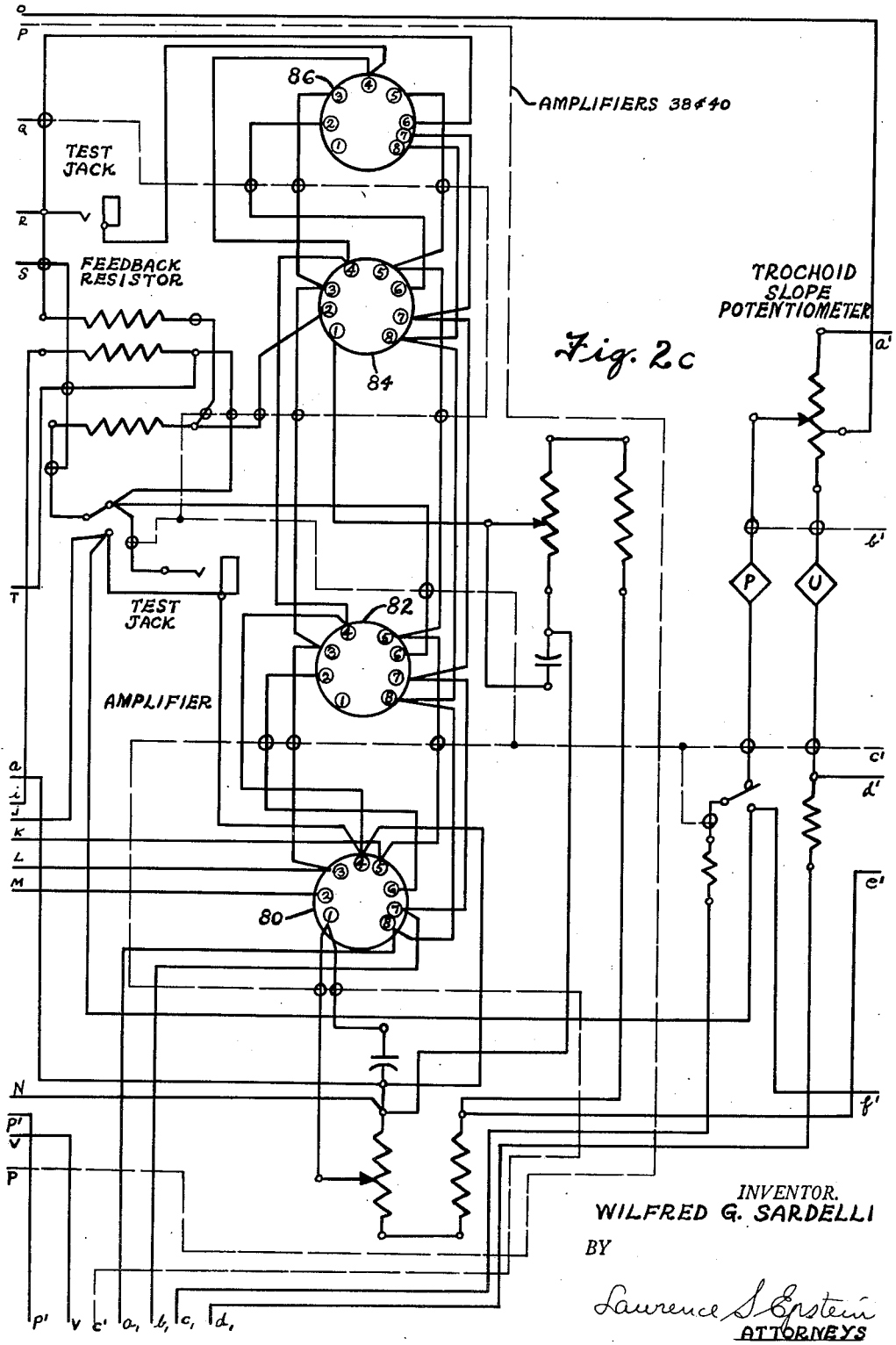

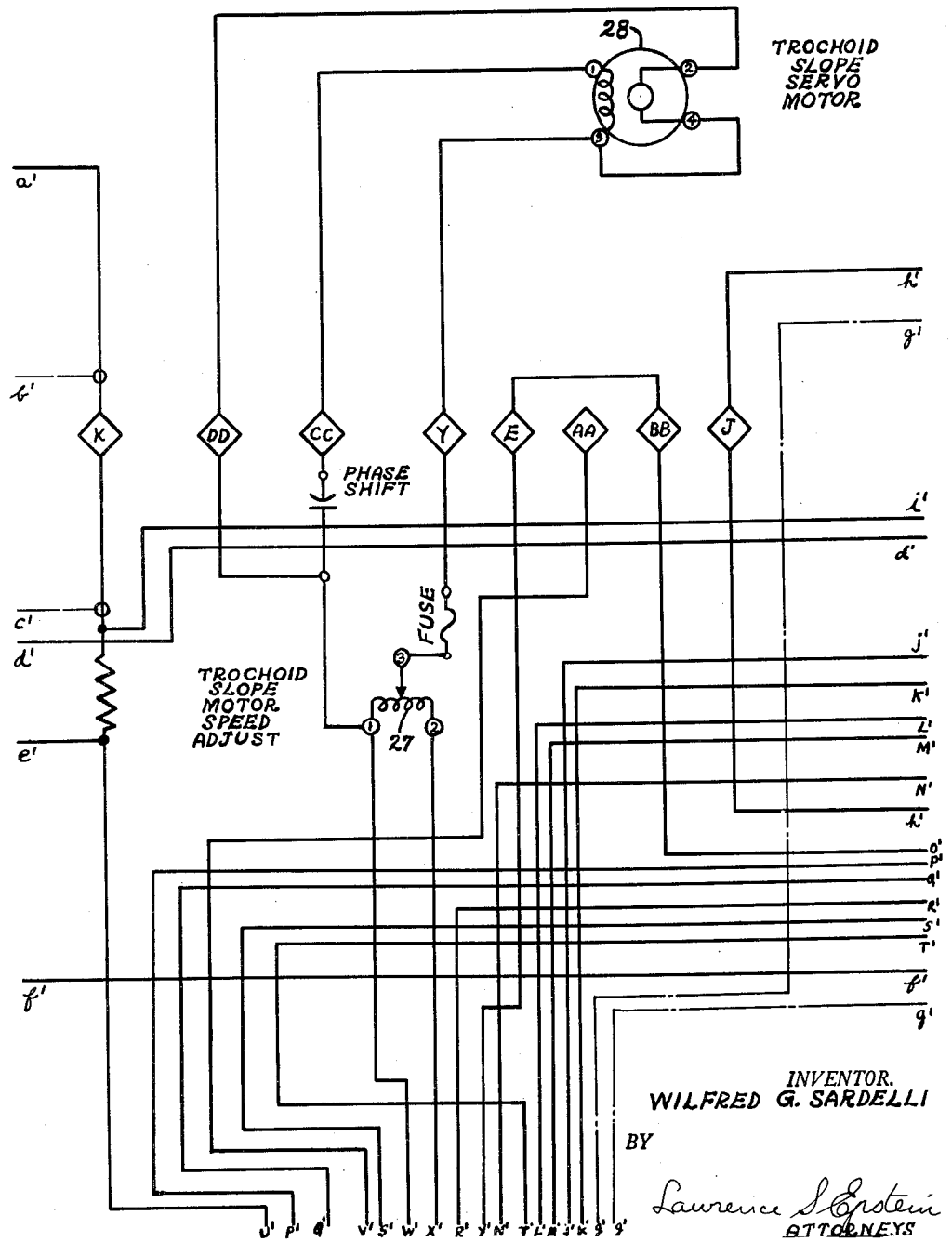

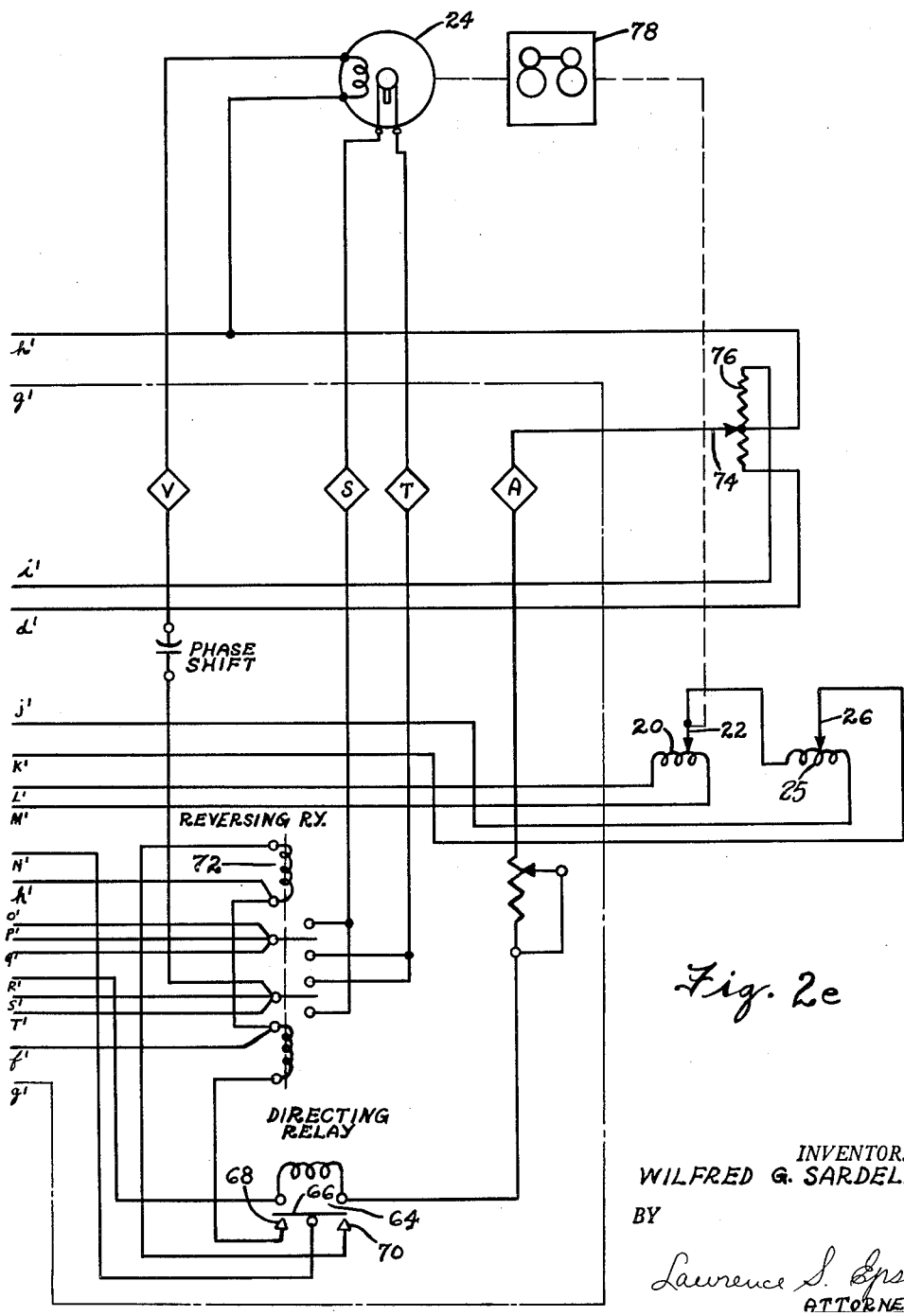

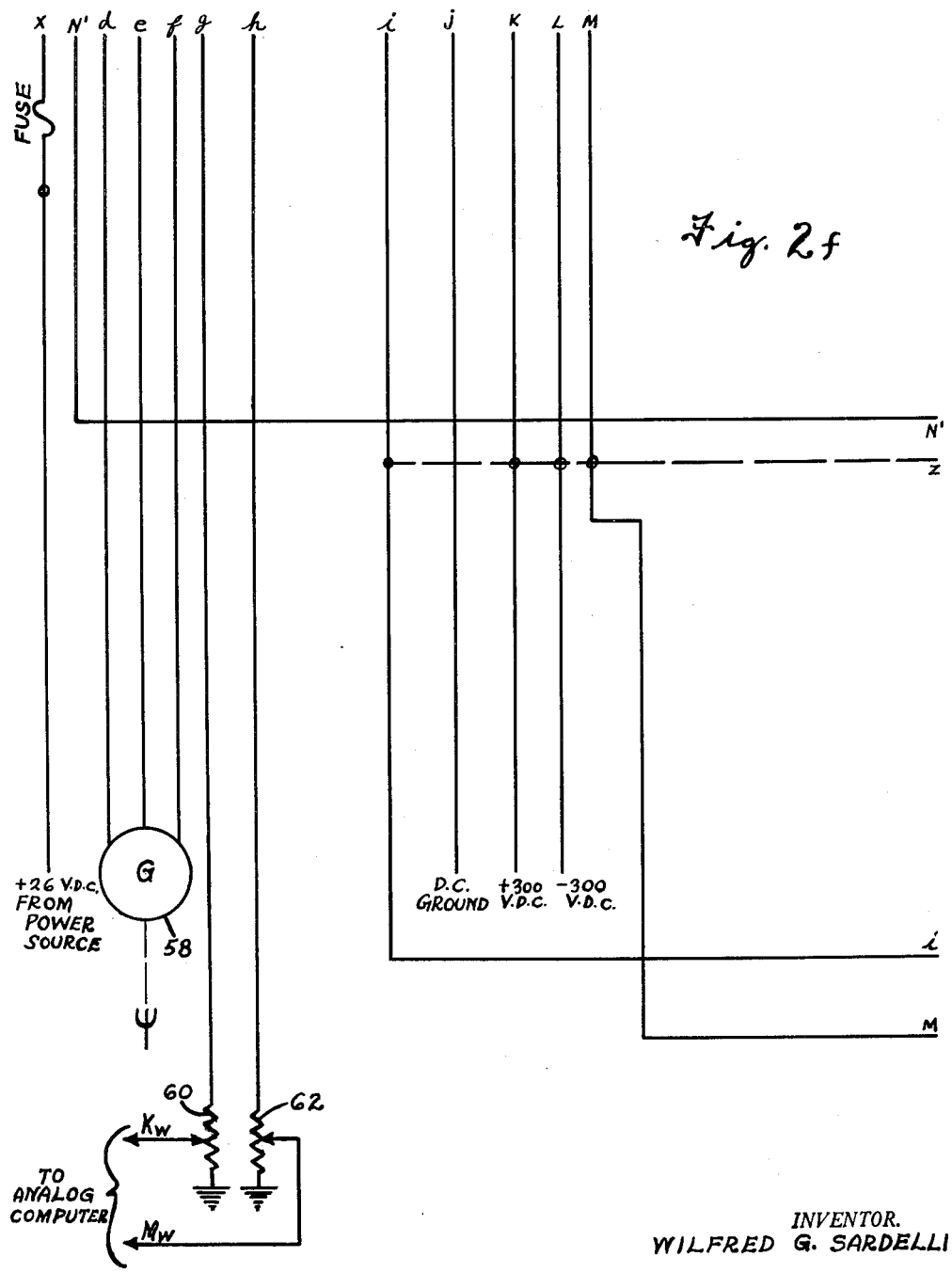

though it will not be described in detail in this discussion.

3,037,298
WAVE ACTION FUNCTION GENERATOR
Wilfred G. Sardelli, Westerly, R.I., assignor, by mesne assignments, to the United States of America as represented by the Secretary of the Navy
Filed Feb. 16, 1960, Ser. No. 9,143
3 Claims. (Cl. 35—10.2)

This invention relates to function generators and in particular to a function generator which produces an electrical output signal corresponding to the hydrodynamic forces exerted by sea wave action on a submarine.

Modern military training utilizes simulator devices to train personnel in the operation of military equipment and machines. The use of simulators results in tremendous savings in money and lives, as well as more effective and efficient training. Examples of simulated training devices are the flight trainers used by the U.S. Navy to train its personnel in the operation of naval aircraft.

The U.S. Navy has also developed a universal submarine simulator to train personnel in the operation of submarines. This submarine simulator is described in a co-pending patent application entitled Universal Submarine Simulator, Serial No. 3466, filed Jan. 19, 1960. The present invention is utilized as a component of the above-mentioned co-pending application.

The reproduction of hydrodynamic forces of a sea wave on a submarine is accomplished by simulating moments about the pitch and roll axes of a submarine by means of electrical signals which have a repetitive trochoidal slope characteristic analagous to the amplitude characteristic of sea waves. The trochoidal wave characteristic is alternated in accordance with submarine and ocean factors and is resolved into sine-cosine components corresponding to pitch and roll moments. The submarine and ocean factors which are involved are submarine speed, heading and depth; and sea wave amplitude and frequency. The structure of the instant invention produces a pair of output signals which represent the most significant terms of the effects of wave action upon a submarine. In a preferred embodiment of the instant invention, a repetitive trochoidal signal is generated by a circular, trochoidally wound potentiometer the contact arm of which rotates continuously. The rotary motion of the potentiometer's contact arm is controlled by a motor whose speed is proportional to its input voltage. The input voltage to this motor varies in accordance with the simulated speed of the submarine and sea wave frequency. The output of the trochoid potentiometer is amplified and applied to a sine-cosine resolver. This resolver may be a potentiometer. The amount of amplification is proportional to the sea wave amplitude.

The contact arms of the sine-cosine potentiometer are rotated by a synchro motor in accordance with the ship's heading relative to the sea wave direction. The sine-cosine resolver provides two outputs each of which is applied to a different potentiometer, the contact arm of which is set in correspondence to the depth of the submarine. These potentiometers are labeled the depth potentiometers, and the output signals of the contact arms of these potentiometers represent the rolling and pitching moments acting on the submarine as a result of wave and submarine factors.

The primary object of this invention is to simulate the effect of sea waves upon a submarine.

Another object of the invention is to provide a random repetitive signal which simulates the effect of sea waves upon a submarine.

A further object of the invention is to provide a random repetitive signal having the hypocycloidal characteristics of sea waves.

Another object of the invention is to provide a signal, the amplitude and frequency of which can be respectively varied in accordance with predetermined values of submarine speed and sea wave frequency to simulate the effect of sea waves on a submarine.

Figure 2G:
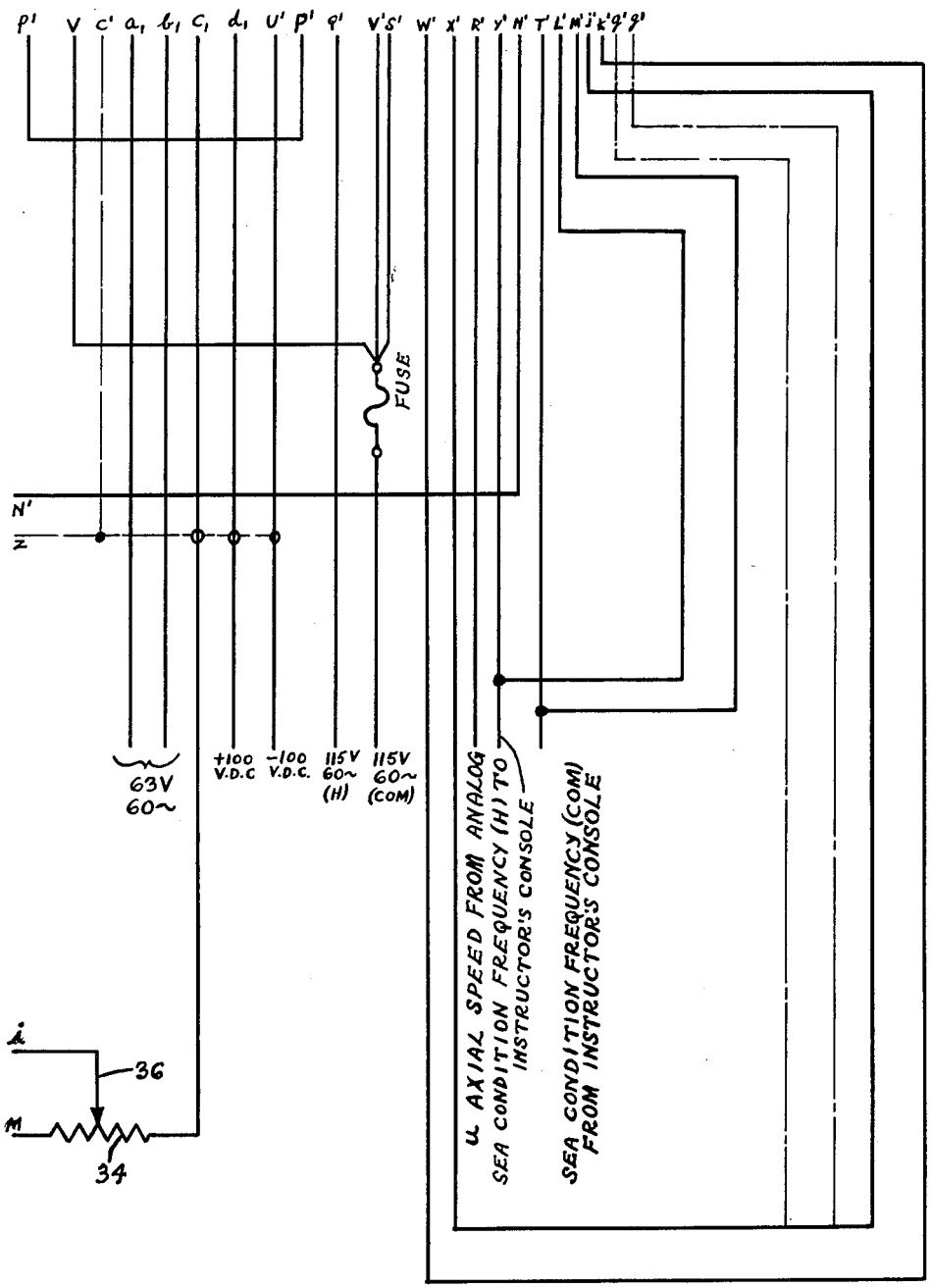

Other objects and many of the attendant advantages of this invention will be readily appreciated as the same becomes better understood by reference to the following detailed description when considered in connection with the accompanying drawings wherein:

FIGURE 1 is a simplified schematic diagram of a preferred embodiment of the invention; and FIGURES 2a–2g is a schematic circuit diagram showing the details of the preferred embodiment of the invention.

As may be seen in FIGURE 1, the components of the wave action function generator are located in various units of the universal submarine simulator.

A 115 volt 60 cps. voltage is supplied to the autotransformer 20 located in the ship's speed generator unit. The output arm 22 of this autotransformer 20 is positioned in accordance with a predetermined value of submarine speed ($\mu$) by means of a motor 24. The A.C. output of first autotransformer 20 is impressed upon second autotransformer 25, the instructor's wave frequency control, which is located in the instructor's console. The output arm 26 of the autotransformer 25 is positioned in accordance with the predetermined value of sea wave frequency.

The output of the wave-frequency autotransformer 25 is fed to a third autotransformer 27, which functions as a speed adjustment for a servo motor 28 which is mechanically coupled to the output 30 of the trochoidally wound potentiometer 32. (This potentiometer 32 is in the strictest sense a hypotrochoidally wound potentiometer.) Changes in the outputs of either autotransformer result in proportionate changes in speed of the servo motor 28. The output of the trochoid potentiometer 32, which simulates the crest-and-trough characteristics of sea waves, is fed through the wave amplitude control 34, a potentiometer which is located in the instructor's console. The instructor may use this potentiometer 34 to set the magnitude of the output of the trochoid potentiometer 32 in accordance with a predetermined value of sea wave amplitude.

The output from potentiometer 34 at potentiometer arm 36 is fed to wave action function generator unit where it is amplified by a pair of amplifiers 38 and 40 and then resolved into sine and cosine components by a sine-cosine potentiometer 42. The shell 44 of this potentiometer 42 is rotated by a low inertia motor 46, the action of the motor 46 being controlled by the frequency limit control 48 and the wave heading deviation control 50. The motor 46 rocks the shell of the sine-cosine potentiometer 42, simulating the effect of slight variations in sea wave direction (i.e., the direction of the sea wave front relative to the heading of the submarine), on the pitch and roll of the submarine.

The position of the contact arms 52 and 54 of the resolving potentiometer 42 is set by a synchro motor 56 which is controlled by a voltage. This voltage is a function of the submarine heading (side), and is generated by a synchro generator 58 located in the ship's course generator unit.

The outputs from the contact arms 52 and 54 are respectively fed to a pair of potentiometers 60 and 62 which are located in the shallow depth guage unit. The outputs of these potentiometers 60 and 62 are dependent on depth (to keel of the submarine) and are signals corresponding to moments about the pitch ($M_w$) and roll ($K_w$) axes of the submarine. These signals are applied as inputs to the analog computer unit of the submarine simulator.

FIGURES 2a–2g presents the detailed schematic circuit diagram of the simplified block schematic of the invention shown in FIGURE 1. Only those parts of the instant invention which were not apparent from FIGURE 1 will be described.

The voltage representing submarine speed ($\mu$) is passed through a relay 64. The contact arm 66 of the relay 64 makes contact with one of its two contact points 68 and 70, depending upon the direction of flow of the current through the relay 64. This applies energizing voltage to one of the two coils of the reversing relay 72 which in turn energizes the low inertia servo motor 24. The servo motor 24 is mechanically coupled to the contact arm 74 of the potentiometer 76 and to the contact arm 22 of the ship's speed autotransformer 20. Servo motor 24 rotates in a direction which depends upon which coil of the reversing relay 72 is energized, until the voltage at the contact arm 74 of potentiometer 76 is equal to the value of the submarine-speed voltage ($\mu$). This cuts off current flow through the coil of relay 64 and halts rotation of the motor 24. At the same time, the contact arm 22 of the autotransformer 20 is set at a position which corresponds to the value of submarine-speed voltage ($\mu$). The second amplifier 40 is a unity gain amplifier and is employed to obtain a signal of the correct polarity to feed to the lower input terminal (see FIGURE 1) of the sine-cosine resolver 42. Each amplifier block 38 and 40 shown on FIGURE 1 is actually comprised of two amplifier units 80, 82 and 84, 86 respectively. The gain of amplifier 38 is controlled by the setting of the contact knob 36 of the instructor's wave amplitude control, the setting of the contact arm 36 determining the amount of feedback through amplifier 38.

As mentioned supra, motor 46 rocks the shell 44 of the sine-cosine potentiometer 42. This simulates slight variations in sea wave direction and gives a random effect. This random effect prevents the development of a roll and pitch pattern which may be memorized by students who are being trained to handle the submarine.

The setting of the frequency limit control 48 determines the speed of the motor 46 and therefore the repetition rate at which the shell of the potentiometer 42 is rocked. Reversal of the motor 46 is effected by means of the automatic limits control 90 and the polarized, double pole, double-throw reversing relay 96. The automatic limit control 90 comprises the selector switches 90 and 92 and a limit switch 94. The contact arms of the selector switches 90 and 92 are mechanically coupled for identical movement to any one of five different selector positions.

The limit switch 94 has ten contact positions, five on either side of center position. The contacts of one selector switch are connected in regular order to different contact positions on one side of the center of the limit switch 94 and the contacts of the other selector switch are similarly connected to the contact positions on the other side of center. The setting of the selector switches 90 and 92 determines the distance that the contact arm 98 of the limit switch 94 must travel in each direction before current is applied to the reversing relay 96 to reverse the motor 46. The contact arm 98 of the limit switch 94 is moved by motor 46 until it strikes the contact which is connected to the preselected contact on switch 90 or 92. A D.C. voltage is then impressed on one of the coils of the reversing relays 96 through the contact arm of the limit switch 94 and through one of the selector switches.

The effects which are exerted by sea waves on a submarine can be expressed in terms of moments exerted about the pitch and roll axes of the submarine. Resolving the hypocycloidal signal into its sine and cosine components provides the moments which a sea wave of the same shape would exert on the pitch and roll axes, respectively. The amplitudes of the sine and cosine signals are then adjusted in accordance with the three factors which affect the amplitude of the rolling and pitching moments in actual practice, i.e., the submarine heading and depth to keel and the sea wave amplitude. This adjustment of amplitude can be accomplished either before or after the resolution of the hypocycloidal signal into its components.

Obviously many modifications and variations of the present invention are possible in the light of the above teachings. It is therefore to be understood that within the scope of the appended claims the invention may be practiced otherwise than as specifically described.

What is claimed is:

1. A function generator providing outputs representative of forces exerted by sea waves upon a submarine comprising in combination, potentiometer means providing an electrical signal having a hypocycloidal characteristic similar to the amplitude characteristic of sea waves, potentiometer means for resolving said signal into its sine and cosine components which represent the turning moment effects of a sea wave upon the pitch and roll axes of a submarine, means altering said signal and its sine and cosine components in accordance with the variables of submarine speed, submarine heading with respect to the sea wave direction, submarine depth to keel, sea wave amplitude and sea wave frequency, including a first amplifier to amplify said hypocycloidal signal, and a second amplifier to invert the polarity of said first amplifier, the output signals from both amplifiers being equal in magnitude and being applied as inputs to said sine-cosine resolving means, and wherein the effect of sea wave amplitude is introduced by a potentiometer, the resistance portions of said amplitude potentiometer being connected in series with the input of said first amplifier and the contact arm of said hypocycloidal potentiometer means and the contact arm of said amplitude potentiometer being connected to the output of said first amplifier so that said amplitude potentiometer constitutes a variable feedback resistor across said first amplifier.

2. A function generator providing outputs representative of forces exerted by sea waves upon a submarine comprising in combination, potentiometer means providing an electrical signal having a hypocycloidal characteristic similar to the amplitude characteristic of sea waves, potentiometer means for resolving said signal into its sine and cosine components which represent the turning moment effects of a sea wave upon the pitch and roll axes of a submarine, means altering said signal and its sine and cosine components in accordance with the variables of submarine speed, submarine heading with respect to the sea wave direction, submarine depth to keel, sea wave amplitude and sea wave frequency, wherein an effect of slight variations in the direction of the sea wave front relative to submarine heading is introduced by rocking the resistance element of said sine-cosine resolving means back and forth relative to the setting of its contact arms by means of a motor and a motor-reversing circuit, said motor having its shaft coupled mechanically to said resistance element.

3. A function generator as set forth in claim 2 wherein said motor-reversing circuit includes a double pole, double throw reversing relay, a multiposition limit switch whose contact arm is mechanically coupled to the shaft of said motor and a pair of multipositioned selector switches having mechanically yoked contact arms, the contact arm of said limit switch energizing said reversing relay whenever it reaches preselected limit positions determined by the setting of said selector switches.

References Cited in the file of this patent

UNITED STATES PATENTS

| | | |
|---|---|---|
| 2,404,387 | Lovell et al. | July 23, 1946 |
| 2,560,527 | Dehmel | July 10, 1951 |